(12) United States Patent
Graf (10) Patent No.: US 7,607,696 B2
(45) Date of Patent: Oct. 27, 2009

(54) ADJUSTABLE STEERING COLUMN FOR A MOTOR VEHICLE

(75) Inventor: Eugen Graf, Werdenberg (CH)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 12/153,775

(22) Filed: May 23, 2008

(65) Prior Publication Data
US 2008/0257097 A1 Oct. 23, 2008

Related U.S. Application Data

(63) Continuation of application No. PCT/EP2006/010394, filed on Oct. 28, 2006.

(30) Foreign Application Priority Data
Nov. 24, 2005 (DE) ........................ 10 2005 056 308

(51) Int. Cl.
*B62D 1/18* (2006.01)
(52) U.S. Cl. ........................ 280/775; 280/776; 280/777; 280/779
(58) Field of Classification Search ................. 280/775, 280/776, 777, 779
See application file for complete search history.

(56) References Cited

U.S. PATENT DOCUMENTS

| | | | |
|---|---|---|---|
| 5,239,889 A | 8/1993 | Hancock | |
| 5,320,384 A | 6/1994 | Arnold et al. | |
| 5,524,927 A * | 6/1996 | Toussaint | 280/777 |
| 5,687,990 A | 11/1997 | Uphaus | |
| 5,988,679 A | 11/1999 | Schelling et al. | |
| 6,039,350 A | 3/2000 | Patzelt et al. | |

(Continued)

FOREIGN PATENT DOCUMENTS

DE 41 33 960 4/1993

(Continued)

OTHER PUBLICATIONS

International Search Report issued Feb. 6, 2007 in the International (PCT) Application of which the present application is the U.S. National Stage.

*Primary Examiner*—Toan C To
(74) *Attorney, Agent, or Firm*—Wenderoth, Lind & Ponack, L.L.P.

(57) ABSTRACT

An adjustable steering column for a motor vehicle includes a setting unit displaceable in at least one displacement direction for setting the position of the steering column, a holding unit nondisplaceable into this displacement direction, a securement device, in the opened state of which the setting unit (4) is displaceable with respect to the holding unit for setting the position of the steering column and in the closed state of which the setting unit (4) is secured in position by the securement device, and a crash blocking device, which is displaceable between a passive state and an active state. The blocking device raises an additional holding force against a displacement of the setting unit with respect to the holding unit into at least one displacement direction. The crash blocking device includes at least one blocking element with at least two blocking noses between which a plate part is located or between which two plate parts are located, and which in the active state of the crash blocking device are in contact on both sides on this plate part or on the plate parts.

23 Claims, 10 Drawing Sheets

U.S. PATENT DOCUMENTS

| | | |
|---|---|---|
| 6,095,012 A | 8/2000 | Lutz |
| 6,276,719 B1 * | 8/2001 | Gartner .................. 280/775 |
| 6,530,600 B1 * | 3/2003 | Marxer et al. ............ 280/777 |
| 6,799,779 B2 * | 10/2004 | Shibayama ............... 280/777 |
| 6,848,716 B2 * | 2/2005 | Lutz ....................... 280/775 |
| 7,367,246 B2 * | 5/2008 | Rhouma et al. ........... 74/493 |
| 7,384,069 B2 * | 6/2008 | Green ..................... 280/775 |
| 7,412,911 B2 * | 8/2008 | Nishioka et al. ........... 74/493 |
| 7,455,320 B2 * | 11/2008 | Imamura et al. .......... 280/777 |
| 2004/0041388 A1 | 3/2004 | Muller |
| 2004/0155448 A1 | 8/2004 | Klukowski et al. |
| 2005/0006889 A1 | 1/2005 | Born et al. |

FOREIGN PATENT DOCUMENTS

| | | |
|---|---|---|
| DE | 195 06 210 | 6/1996 |
| DE | 196 17 561 | 9/1997 |
| EP | 0 802 104 | 10/1997 |
| EP | 0 836 981 | 4/1998 |
| EP | 1 361 137 | 11/2003 |
| EP | 1 433 687 | 6/2004 |
| WO | 03/018385 | 3/2003 |

* cited by examiner

ADJUSTABLE STEERING COLUMN FOR A MOTOR VEHICLE

This application is a continuation of International Application No. PCT/EP2006/010394, filed Oct. 28, 2006.

BACKGROUND OF THE INVENTION a) Field of the Invention

The invention relates to an adjustable steering column for a motor vehicle, with a setting unit displaceable into at least one displacement direction for setting the position of the steering column, a holding unit nondisplaceable into this displacement direction, a securement device, in the opened state of which the setting unit is displaceable with respect to the holding unit for setting the position of the steering column and in the closed state of which the setting unit is secured in position by the securement device, and a crash blocking device, which is displaceable between a passive state, in which the setting unit is displaceable with respect to the holding unit in the opened state of the securement device for setting the position of the steering column, and an active state, in which the crash blocking device raises an additional holding force against a displacement of the setting unit with respect to the holding unit into at least one displacement direction.

b) Description of Related Prior Art

Adjustable steering columns serve to increase the convenience and comfort of the driver and can be changed with respect to length, height, and/or angular position in order to be able to adapt in this way the position of the steering wheel to the seating position of the driver. To do this, these steering columns include a setting part whose position with respect to a holding part can be changed and be secured in position with a securement device or a clamping system. The case in which the setting part is secured in position with respect to the holding part can be considered to be the normal operating state since the motor vehicle is only intended to be driven in this state.

In adjustable steering columns the problem is encountered that in the event of a crash the uncontrolled dislocation of the steering column must be prevented so that, for example, sufficient retaining force for opening the airbag is available and/or the energy upon the impact of the driver onto the steering wheel can be dissipated under control. The securement device simultaneously is to be smooth in operation and capable of being opened and closed with short strokes of the actuation members and is to assume only a small installation space.

For securing the set position, EP 0 802 104 B1 for example proposes intersecting lamella disk packs, wherein the first one is connected on the setting part, here a jacket unit, supporting the steering spindle, and the second one on the holding part connected to the vehicle chassis. The two intersecting lamella packs are penetrated by a clamp bolt and tightened against one another by the actuation of a clamping lever. In order for the steering column to be adjusted, the lamellae have elongated holes oriented in the adjustment direction of the steering column, the elongated holes being oriented identically in all lamellae of a lamella pack.

These systems already permit securement in position of the steering column with few lamellae and a short actuation stroke and a relatively low clamping force. However, in order to be able to absorb the high holding forces such as are required in the event of a crash, the number of lamellae and/or the clamping force must be increased. The securement device becomes thereby more complicated, more expensive and requires more installation space. Furthermore, the strokes and forces for the actuation of the clamping lever become greater. The energy dissipation, moreover, can only be set imprecisely during the slipping-through of the securement device.

EP 0 836 981 proposes, for example, to secure the set position to bring a toothed rack, fastened on a carrying unit connected with the vehicle chassis, into engagement with a second toothed rack fastened on the jacket unit accepting the steering spindle. To adjust the steering column, these toothed racks are brought out of engagement so that adjusting the steering column becomes possible.

In order for such systems not to slip through in the event of a crash, the toothings must be laid out appropriately sturdily and sufficient clamping force must be provided such that the toothings do not come out of engagement. Therewith the strokes and forces for actuating the clamping lever become greater. Moreover, a sturdy layout of the toothing demands that the tooth intervals become greater, wherein the step width, in which the steering column can be adjusted, increases. However, for convenience and comfort it is desirable to make possible an adjustment which is as continuous as possible or is at least closely stepped.

Both of the described principles, moreover, require a very high rigidity of the vehicle body-side carrying unit.

DE 196 17 561 C1 therefore proposes, in addition to the securement device, a crash blocking device with an additional arrest part, which acts independently of the securement device and, in the event of a crash, raises an additional holding force.

However, the disadvantage of this solution is that such additional arrest part must be provided which demands additional installation space and expenditures. It must further be ensured that such an additional arrest part in the event of a crash, but only in this event, comes reliably into engagement and, for the case that the steering column is to be adjusted, is reliably brought out of engagement.

EP 1 433 687 A2 discloses providing a canted part acting upon a deformation of the steering column in the event of a crash, which part after it has been canted applies an additional holding force against a displacement of the set position of the steering column. For this canted part to become effective, however, depends on the deformation of the steering column in the event of a crash.

The adjustable steering column disclosed in DE 195 06 210 C1 comprises a blocking member with a blade edge which can be pressed against a clamping flange when closing the securement device. In the event of a crash the blade edge of this blocking member digs into the material of the clamping flange in order to bring about as form-fittingly a locking as possible of the jacket unit of the steering column with the holding unit stationary on the vehicle body.

DE 41 33 960 C2 describes a safety arrangement for motor vehicle steering columns, wherein the end of the steering column facing the driver is shifted forwardly in the event of a crash. For this purpose a swivellable (cutting) edge holder is provided on which pressure or tension means, for example pyrotechnical arrangements, attack. In the event of a crash, the cutting edge of the edge holder penetrates into a jacket tube of the steering spindle or into the steering spindle.

SUMMARY OF THE INVENTION

The present invention addresses the problem of providing (in the event of a crash) a sufficiently high holding force in an adjustable steering column for a motor vehicle such that, for example, the function of the airbag is ensured or, for example, the energy upon the impact of the driver onto the steering wheel can be absorbed under control, wherein simultaneously at least some disadvantages of prior art are eliminated. The securement device, in particular, is to be actuated with the least possible actuation forces and actuation strokes alternatingly between the opened and closed state.

According to the invention the problem is solved through an adjustable steering column comprising a setting unit displaceable into at least one displacement direction for setting the position of the steering column, a holding unit nondisplaceable into this displacement direction, a securement device, in the opened state of which the setting unit is displaceable with respect to the holding unit for setting the position of the steering columns and in the closed state of which the setting unit is secured in position by the securement device, and a crash blocking device which is displaceable between a passive state, in which the setting unit is displaceable with respect to the holding unit in the opened state of the securement device for setting the position of the steering column, and an active state, in which it raises an additional holding force against a displacement of the setting unit with respect to the holding unit into at least one displacement direction.

The crash blocking device can comprise at least one blocking element with at least two blocking noses, between which a plate part is located and which in the active state of the crash blocking device are in contact on opposite sides on this plate part. Either the blocking element is connected with the holding unit nonshiftable into the displacement direction in which it is effective and the plate part is connected with the setting unit nonshiftable in this displacement direction, or the blocking element is connected with the setting unit nonshiftable into the displacement direction in which it is effective and the plate part is connected with the holding unit nonshiftable into this displacement direction.

Alternatively, the crash blocking device can comprise at least one blocking element with at least two blocking noses, between which two plate parts in contact on one another are located and which, in the active state of the crash blocking device, are in contact on the surfaces facing away from one another of these two plate parts. One of these two plate parts is connected with the holding unit nonshiftable in the displacement direction in which the blocking element is effective and the other of these two plate parts is connected with the setting unit nonshiftable into this displacement direction.

The crash blocking device consequently comprises at least one blocking element with at least two blocking noses between which in a first embodiment of the invention a single plate part is located and which, in the active state of the crash blocking device, are in contact on both sides on this plate part, wherein either the blocking element is connected with the holding unit such that it is nonshiftable into the displacement direction in which it is effective, and the plate part is connected with the setting unit nonshiftable into this displacement direction. Alternatively, the blocking element is connected with the setting unit nonshiftable into the displacement direction in which it is effective and the plate part is connected with the holding unit nonshiftable into this displacement direction.

In a further embodiment of the invention there are located between the blocking noses of the blocking element two plate parts, of which one is connected with the holding unit such that it is nonshiftable in the displacement direction in which the blocking element is effective and the other is connected with the setting unit nonshiftable into this displacement direction.

One advantage of the implementation according to the invention is inter alia that the steering column can have a relatively simple implementation at high reliably acting holding force in the event of a crash.

BRIEF DESCRIPTION OF THE DRAWINGS

In the following, the invention will be explained in conjunction with schematic Figures.

FIG. 1 shows a schematic diagram of the operational function for an embodiment of the invention, in which FIGS. 6 and 7 show two views of the steering column according to FIG. 5, FIGS. 8a, 8b and 8c show schematic partial sections of the steering column of FIG. 5 in the proximity of the crash blocking device in the opened state of the securement device, in the closed state of the securement device and in the event of a crash.

DETAILED DESCRIPTION OF THE INVENTION

In conjunction with FIGS. 1 to 4, first, the functional principle of the crash blocking device will be explained. The crash blocking device comprises a blocking element 8 with at least two blocking noses 9, 10 between which projects a plate part 26 (i.e. the blocking noses 9, 10 are located on both sides of the plate part 26). The blocking element 8 with its blocking noses 9, 10 herein encompasses at least one longitudinal edge of plate part 26 or at least one longitudinal edge of a recess in the plate part 26. The plate part 26 is overall planar, or flat.

Figure 1A:
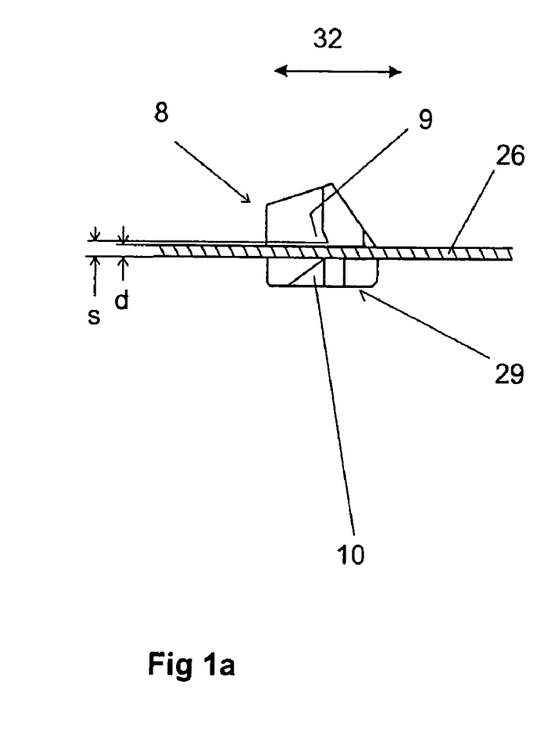
FIG. 1a is a depiction in the opened state of the securement device.

Thickness d of the encompassed plate part 26, which in the preferred case is formed of planar sheet metal, is herein so small that the blocking noses 9, 10 at the appropriate orientation of the blocking element 8 have some play with respect to the plate part 26. Due to this play in the position of the blocking element 8 shown in FIG. 1a, which position corresponds to the passive state of the crash blocking device, a shift between the blocking element 8 and the plate part 26, in both directions of a displacement direction 32, is made possible, which displacement direction is indicated in FIG. 1a by a double arrow. Accordingly, the opening width s between the two blocking noses 9, 10, respectively in the example shown here, is slightly greater than the thickness d of the plate part.

Figure 1B:
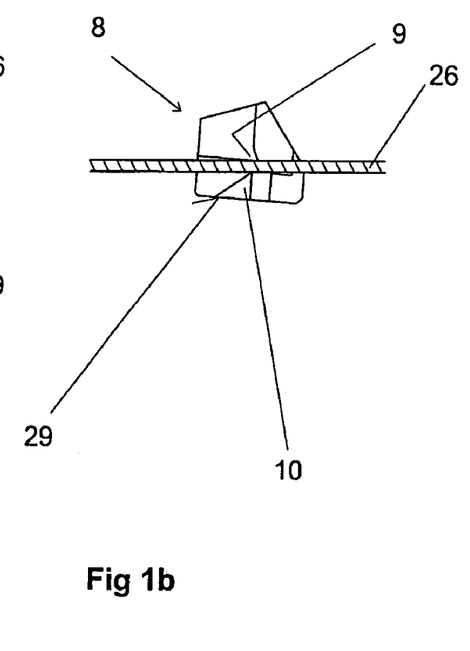
FIG. 1b is a depiction in the closed state of the securement device.
Figure 1C:
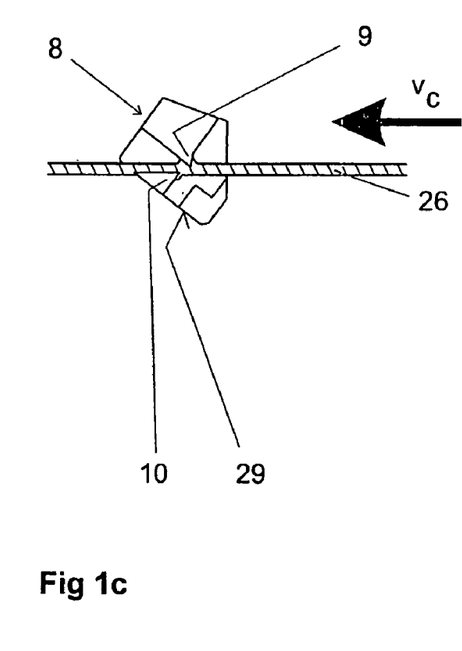
FIG. 1c is a depiction in the event of a crash.
Figures 2, 3:
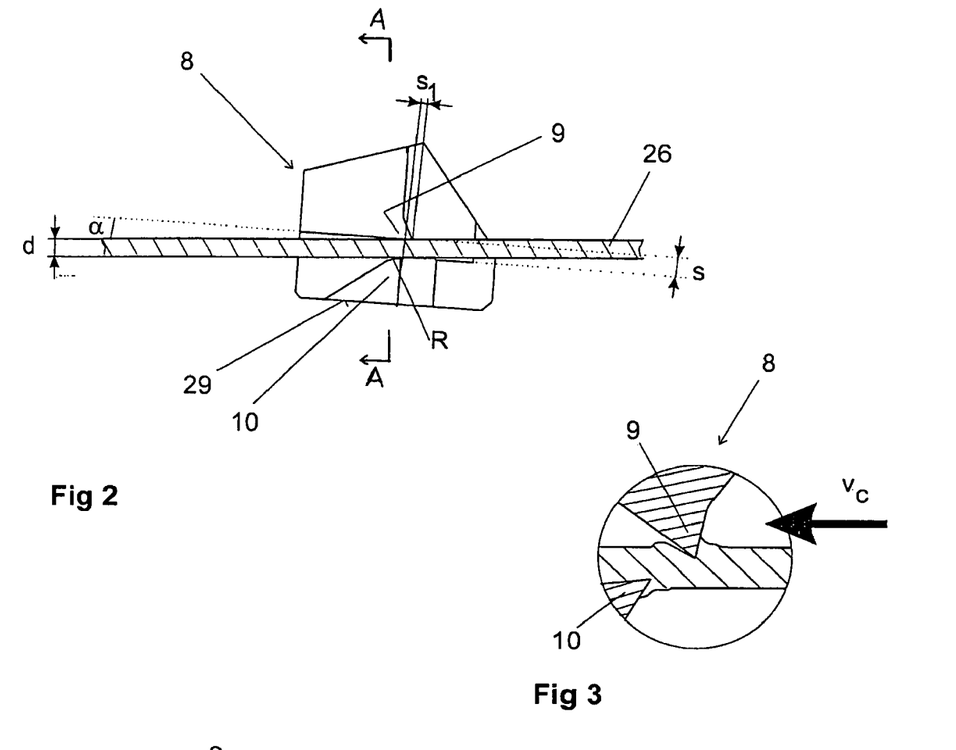
FIG. 2 shows an enlarged segment from the view according to FIG. 1b.
FIG. 3 shows an enlarged segment from the view according to FIG. 1c.
Figure 4:
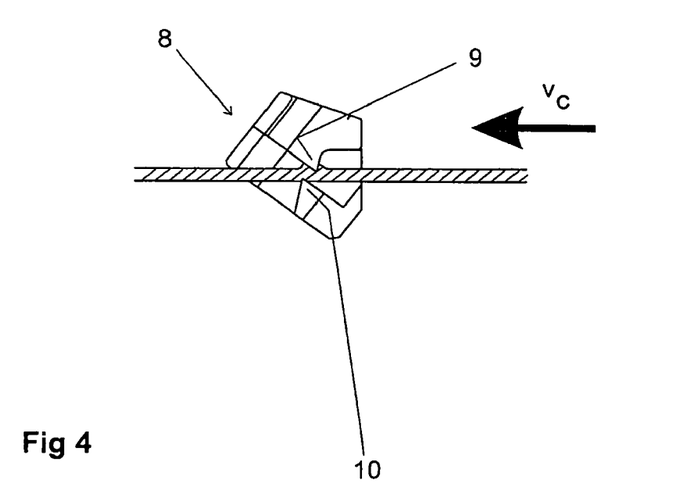
FIG. 4 shows a view in the event of a crash for another embodiment of the blocking element.
Figure 5:
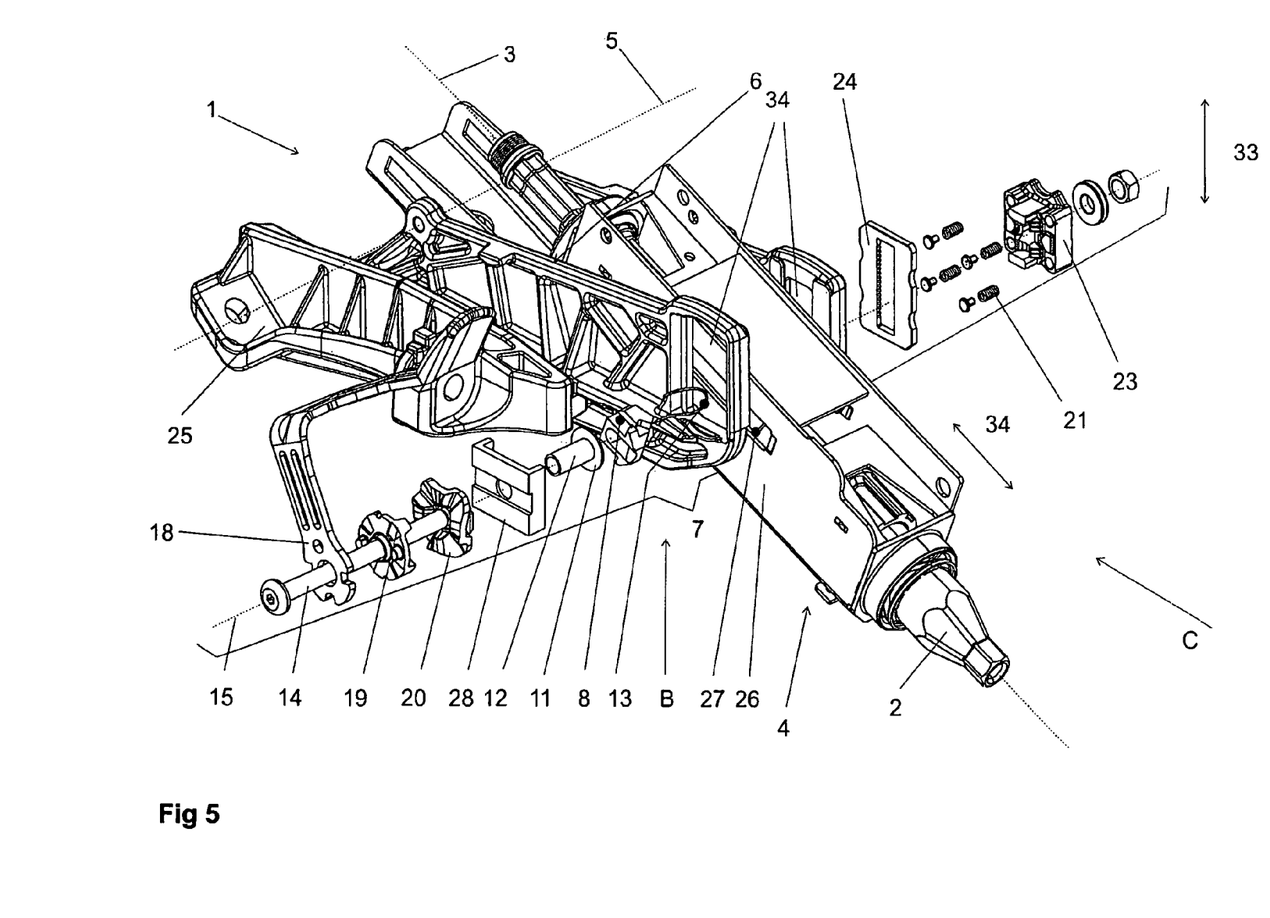
FIG. 5 shows a schematic isometric view of an embodiment of a steering column according to the invention, wherein the components of the securement device are shown in exploded view.
Figure 6:
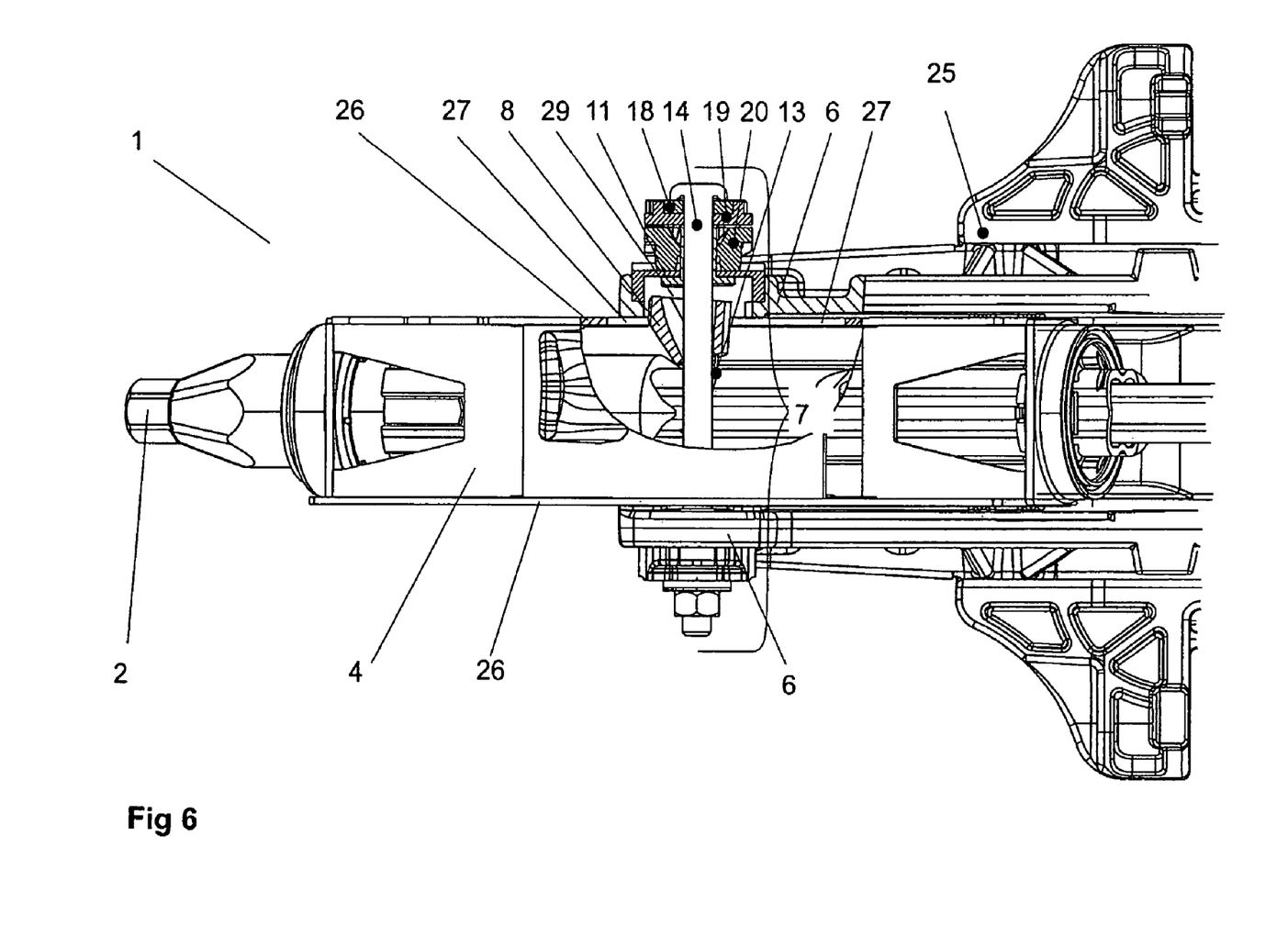
Figure 7:
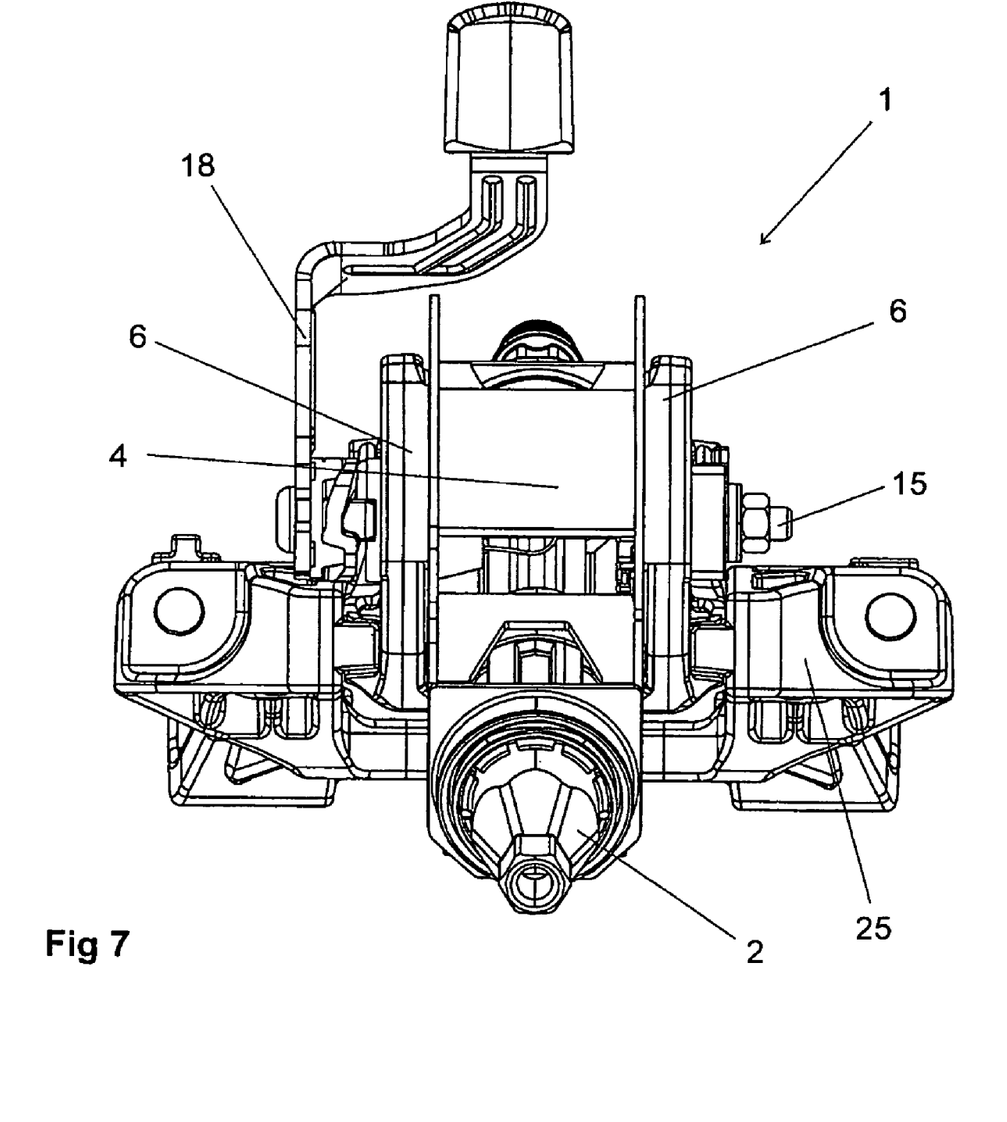

Through a small intentional and specific turning out of position of the blocking element, however, both ends of the blocking noses 9, 10 are brought into contact on plate part 26. This position of the blocking element 8, which corresponds to the active state of the crash blocking device, is shown in FIG. 1b. In the event of an incipient shift $v_c$ of the plate part 26 with respect to the blocking element 8 parallel to the displacement direction 32, the plate part 26, due to the frictional-locking contact on the blocking noses 9, 10, is clamped more firmly between the two pointed or blade-form ends of the blocking noses 9, 10. The tips or edges of the blocking noses 9, 10 herein dig into the plate part, as is shown in FIGS. 1c, 3 and 4, and in this way effect a holding force against a shift of the plate part 26 with respect to the blocking element 8.

Alternatively to the digging of the tips or edges, these can also effect the desired holding force through strong friction or through scraping. In this case, not shown here, the blocking noses have a different form obvious to a person of skill in the art. For example, the radius R at the tip or edge in the blocking nose 10 is enlarged and the blocking nose 9 in the event of a crash is oriented in the direction of the shift $v_c$ and not, as indicated in FIG. 2, counter to the direction of the shift $v_c$ of plate part 26. If the additional holding force is effected through friction or scraping, a controlled energy dissipation can be set.

As further means for setting the additional holding force, the offset S1 is provided in the direction of the shift stroke $v_c$ between the two blocking noses 9 and 10. With the aid of the offset S1, the radii of the tips of the blocking noses R and the opening width s between the two blocking noses as well as of thickness d of the plate part 26 the angle α is determined in the active state.

Via the frictional force, which in the event of a crash is applied between blocking noses and plate part, a corresponding torque is generated which leads to an enlargement of angle α and therewith determines the additional holding force. Angle α can be limited to a maximal value through corresponding stops.

In these embodiments, the blocking element can be turned out of position about an imaginary axis with respect to the plate part 26, which axis is parallel to the plane of the plate part 26 and at right angles to the displacement direction 32. In the active state of the crash blocking device, the blocking element 8 is turned out of position about this axis compared to the passive state of the crash blocking device. In the active state of the crash blocking device, the blocking noses 9, 10 are in contact on both surfaces of the plate part 26. In the passive state of the crash blocking device at least the one or several blocking noses 9 cooperating with one of the two surfaces of the plate part 26 are raised from this surface of the plate part 26. The axis about which the blocking element 8 can be turned out of position can extend, for example, through the tip or blade of the blocking nose 10.

The surfaces of plate part 26, with which the blocking noses 9, 10 cooperate, are the main or large surfaces of the plate part 26 and not the end side narrow surfaces.

The blocking nose 9 includes an area segment directed toward the plate part 26, which segment in the active state of the crash blocking device forms with the surface of plate part 26 an angle α which, at least unless a crash event has occurred, is greater than 0° and less than 10°, wherein one end of this area segment of the blocking nose 9 is in contact with the surface of the plate part 26. This area segment in the passive state of the crash blocking device forms with the surface of plate part 26 an angle α of approximately 0° and is raised from the surface of plate part 26.

With an incipient shift $v_c$ of the plate part 26 relative to the blocking element 8 in that direction parallel to the displacement direction 32 in which the blocking element 8 is effective, a torque is generated acting onto the blocking element 8, through which at least one of the blocking noses 9, 10 is more strongly pressed onto the plate part 26. The blocking noses 9, 10, which are in contact on both sides of the plate part 26, are herein preferably disposed offset with respect to one another with respect to the displacement direction 32. These blocking noses 9, 10 thus have different distances from the rotational axis of the blocking element 8. However, it is also feasible to generate such torque at identical distances of the blocking noses 9, 10 from the rotational axis of blocking element 8.

Figure 9A:
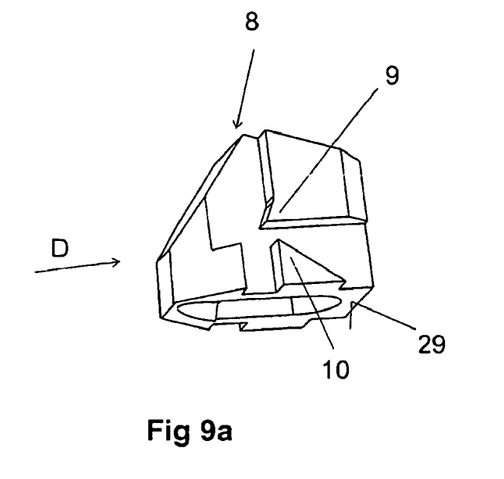
FIGS. 9a, 9b, 10a and 10b show the blocking element in two embodiments in isometric view.
Figure 9B:
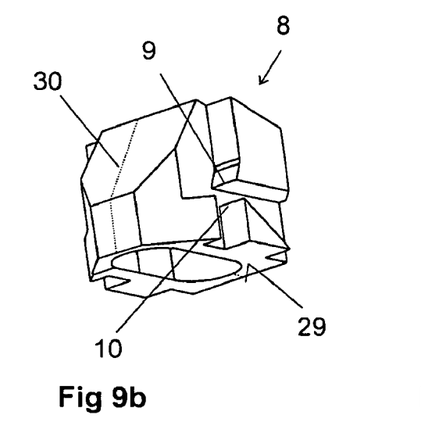

In FIGS. 9a, 9b as well as 10a, 10b two different embodiments of the blocking element are each depicted in two different isometric views. Both cases involve an implementation in which the blocking element 8 in the mounted state penetrates a cutout in the plate part 26, which cutout is formed in the shape of an elongated hole extending parallel to the displacement direction 32, wherein the plate part includes on two opposite sides at least two blocking noses 9, 10 each, with which it encompasses the two longitudinal edges of the cutout.

The embodiment according to FIGS. 9a and 9b corresponds to the embodiment in FIG. 3, in which in the event of a shift $v_c$ both blocking noses 9 and 10 dig into the plate part 26.

Figure 10A:
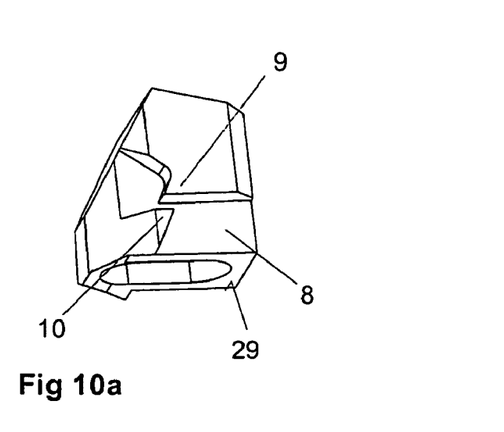
Figure 10B:
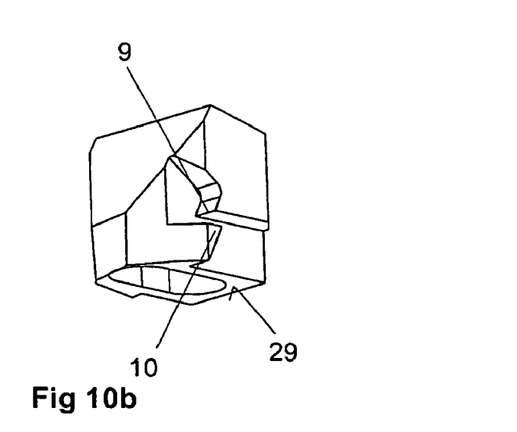

In the embodiment according to FIGS. 10a and 10b, which corresponds to FIG. 4, only one of the two blocking noses, here the blocking nose 9, digs into the plate part 26. The second blocking nose 10 is pressed onto the surface of plate part 26 and effects a scraping or partially compresses the thickness d of plate part 26 in interaction with the first blocking nose 9.

Feasible radii R of the tips or blades of the blocking noses are in the range from approximately 0.1 mm to 4 mm, the lower limit being substantially determined by the fabrication method used to produce the blocking nose. In the preferred case, the blocking element 8 is integrally sintered with the blocking noses 9, 10 and the blocking noses 9, 10 are not machine finished by means of machining or grinding. For simplification the blocking element 8 can also be produced in two parts by sintering, wherein the subparts, preferably two mirror symmetrical parts, are placed together along the parting line 30 (cf. FIG. 9b) without joining operation or are connected using a joining operation. The connection can also take place simply by sinter-bonding, adhesion, soldering, welding or by using other means.

Figure 11A:
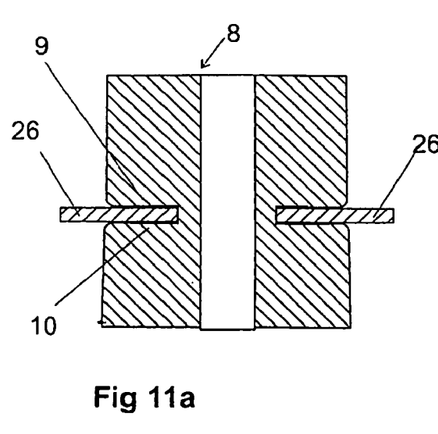
FIGS. 11a and 11b show schematically in section (section line A-A in FIG. 2) two different embodiments of the blocking element.
Figure 11B:
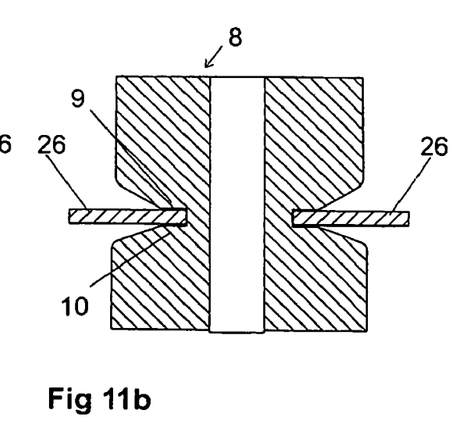

FIGS. 11a and 11b show cross sections through the blocking element 8 and the plate part 26 along the section line A-A in FIG. 2 for different feasible embodiments. The Figures illustrate that the blocking noses 9, 10 in the transverse direction to the displacement direction 32 or movement direction $v_c$ can have different profiles. Herein technical fabrication aspects are primarily in the foreground. For example, a slanting off in the transverse direction can facilitate the orientation of plate part 26. Simple chamfering or radii transitions are feasible and do not restrict the function of the blocking element 8.

Figure 12:
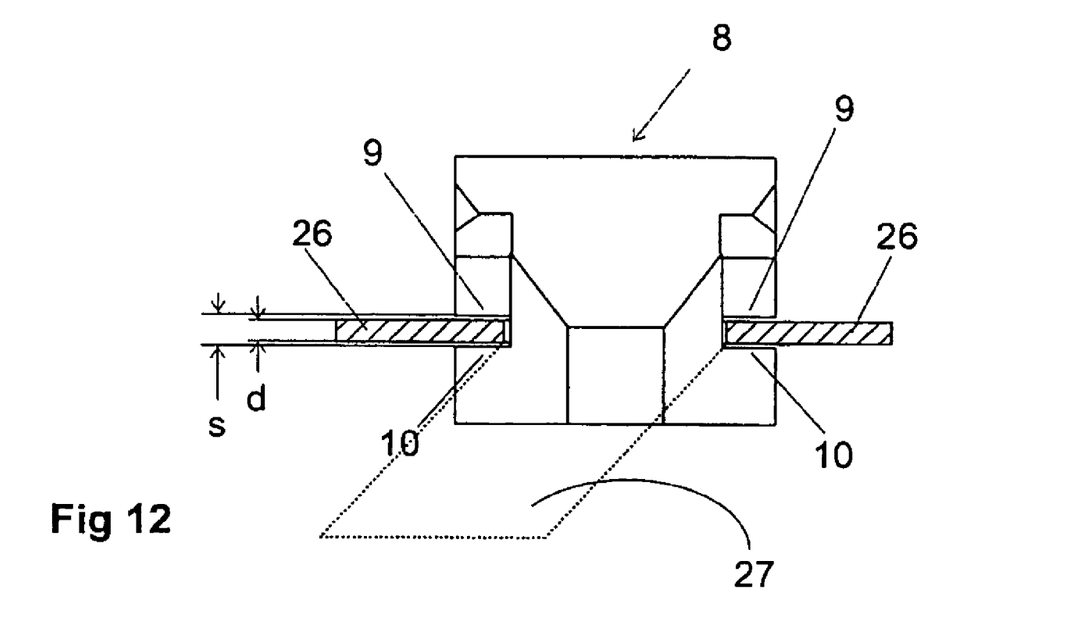
FIG. 12 shows schematically the engagement of the blocking element into the plate part (in a view of the blocking element according to the viewing direction D of FIG. 8a)
Figure 13:
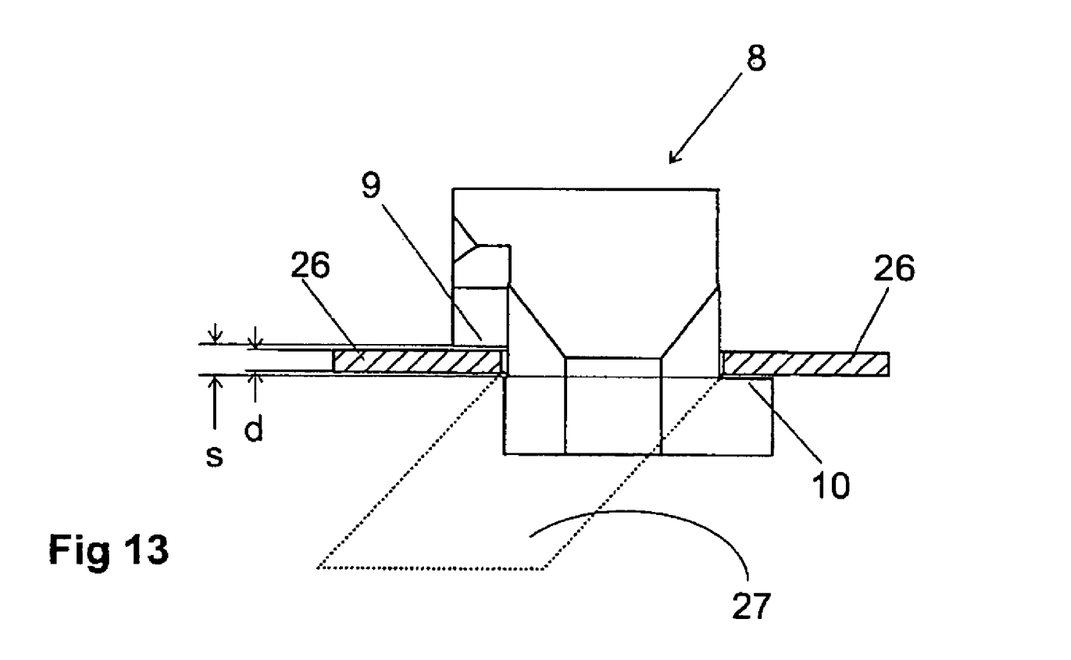
FIG. 13 illustrates another embodiment of the blocking element in engagement with the plate part (view analogous to FIG. 12)

FIGS. 12 and 13 show two different embodiments of the blocking element 8 in a view directly from the front, viewing direction D in FIG. 9*a*. In the embodiment shown in FIG. 13, the blocking noses 9, 10 are not disposed on one side of the elongated hole 27 in plate part 26, but rather the blocking nose 9 is located on the one side and the blocking nose 10 on the other side of elongated hole 27 (which is indicated in FIGS. 12 and 13 by dotted lines in isometric representation). It is also conceivable and feasible to form, instead of four blocking noses as are shown schematically in FIG. 12, only two blocking noses on one side of the elongated hole or three blocking noses on blocking element 8.

In principle, it would also be conceivable and feasible that the blocking element 8 with the blocking noses 9, 10 encompasses at least one longitudinal edge of the plate part 26 (and not the longitudinal edge of a cutout in plate part 26), wherein this longitudinal edge, again, extends parallel to the displacement direction 32.

FIGS. 5 to 8 illustrate schematically the application of the described crash blocking device on an adjustable steering column 1. In this embodiment example, a setting unit 4 is displaceable in the displacement direction 32, which corresponds to the length adjustment of the steering column, and in the displacement direction 33, which corresponds to the inclination or height adjustment of the steering column, with respect to a holding unit 6 in the opened state of a securement device 7.

The setting unit 4, which in the depicted embodiment example is formed in the shape of a jacket tube, holds the steering spindle 2 and supports it rotatably about the steering spindle axis 3, wherein at the driver end of the steering spindle 2 the steering wheel, not shown here, is fastened.

The holding unit 6 is connected to the chassis of the motor vehicle, and specifically in the depicted embodiment example via a carrying unit 25 fastened on the chassis of the motor vehicle. In the event of a crash, depending on the embodiment, it can be provided that the holding unit 6 can dislocate with respect to the carrying unit 25 with the consumption of energy. Solutions herefore are known and are not a component of the invention and therefore will also not be further explained here.

The securement device 7 serves for securing and for releasing the displaceability of the position of the setting unit 4 with respect to holding unit 6. In the embodiment example in the opened state of the securement device 7, the setting unit 4 is longitudinally shiftable with respect to the holding unit 6 in the axial direction 3 of the steering spindle 2 (displacement direction 32) and turnable about the swivel axis 5 (displacement direction 33). To open and close the securement device, the clamping lever 18 is provided. Opening and closing the securement device 7 under motor action is also conceivable and feasible.

In the closed state of the securement device 7, the setting unit 4 is secured in position with respect to the holding unit 6 by securement elements of the securement device (for example toothings or friction faces) such that under forces acting in normal operation onto the setting unit 4 (thus except for the event of a crash), no displacement of the set position of the steering column occurs.

The securement device 7 in this implementation is formed as a clamping system in which a clamp bolt 14 penetrates the holding unit 6 and the setting unit 4. In the closed state of the securement device 7, the setting unit 4 and the holding unit 6 are tightened against each other via the clamp bolt 14. As depicted, the setting unit 4 is herein preferably located between side jaws of the holding unit 6.

Opening and closing the securement device takes place by turning out of position a cam plate 19 with respect to a connecting link plate 20. The cam plate 19 is actuated through the clamping lever 18. The securement of the position in the example with respect to the displacement direction 33 takes place via the engagement of a toothed clamping block 23 into the toothing of a toothed plate 24. Through the cam-connecting link guidance, the toothings are herein brought into engagement under high compression stress. When the securement device is opened, the toothings are raised from one another through the force of compression springs 21. The securement of the position with respect to the displacement direction 32 takes place by pressing the side jaws of the holding unit 6 onto the setting unit 4 in the closed state of the securement device 7.

Alternatively to the toothings or individual friction faces, packs of lamellae, such as for example proposed in EP 0 802 104 B1, can also be applied, or also other methods of position securement can be used.

Conceivable and feasible are also clamping systems acting on one side, in which the clamping mechanism overall is only disposed on one side of the steering spindle.

The clamp bolt 14 penetrates the holding unit 6 and the setting unit 4 through elongated holes 27, 34. It is herein shiftable relative to the setting unit 4 in the displacement direction 32 (and nonshiftable in the displacement direction 33) and relative to the holding unit 6 shiftable in the displacement direction 33 (and nonshiftable in the displacement direction 32). In the depicted embodiment example herein a plate 28 is provided, which is supported on one of the side jaws of holding unit 6 such that it is shiftable in displacement direction 33, which plate is penetrated by clamp bolt 14 through an opening.

In the depicted steering column, the crash blocking device is integrated into the securement device 7, the blocking element 8 being penetrated by clamp bolt 14. The plate part 26, with which the blocking element 8 cooperates, is formed by a side jaw of the setting unit 4. The blocking element 8 is disposed in the manner already described in the elongated hole 27 of this side jaw. Since the clamp bolt 14 is disposed nonshiftable into the displacement direction 32 with respect to the holding unit 6 and the blocking element 8 is disposed nonshiftable into the displacement direction 32 on the clamp bolt 14, the blocking element 8 is held nonshiftable into the displacement direction 32 even in the opened state of the securement device 7, while the setting unit 4, and consequently the plate part 26, in the opened state of the securement device 7 is shiftable into the displacement direction 32. In this displacement direction 32, the blocking element 8 is effective in the embodiment example, and specifically the action of the blocking element has its onset, if from the steering wheel end of the steering spindle 2 a force is exerted onto the setting unit 4 which exceeds the holding force of the other securement elements of the securement device 7.

Alternatively, it is also conceivable and feasible that the clamp bolt 14 is nonshiftable with respect to the setting part 4 into the displacement direction 32, into which the blocking element 8 acts (and the blocking element 8 disposed on the clamp bolt 14 is again nonshiftable into this displacement direction 32 with respect to the clamp bolt 14). The plate part 26 is formed by a side jaw of the holding unit 6, which includes an elongated hole extending in the displacement direction 32.

In the closed state of the securement device 7, the blocking element 8 is tilted (about an axis parallel to the plane of the plate part 26 and at right angles to the displacement direction 32) through a spring 13, which, in the embodiment, is stayed against the clamp bolt 14, by an angle α compared to the opened state of the securement device 7. Thus, both blocking noses 9 and 10 are brought into contact on the plate part 26 of the setting unit 4.

In the operational state, the securement device 7 is closed and the setting unit 4 is secured in position with respect to the holding unit 6. In the event of a crash of the motor vehicle, however, the holding force of the securement device 7 against a shifting of the setting unit 4 with respect to the holding unit 6 can be exceeded, such that an incipient relative shift of the two units occurs. Through the friction force between the plate part 26 and the blocking noses 9, 10, a torque results acting onto the blocking element 8 and the tilting of the blocking elements is increased and the blocking noses 9, 10, in addition to the holding force exerted by the securement device 7, exert a holding force against a further shift of the two units 4, 6 with respect to one another. Therein, as has already been explained above, depending on the implementation of the blocking element 8 and its blocking noses 9 and 10, an additional holding force can result through friction, scraping or through digging of one or both blocking noses 9, 10 into the plate part 26.

In the depicted embodiment, in which the blocking element 8 is penetrated by a clamp bolt 14, through the layout of the cutout of the blocking element 8 for receiving the clamp bolt 14, the maximum possible angle α is determined about which the blocking element 8 tilts in the event of a crash.

Figure 8A:
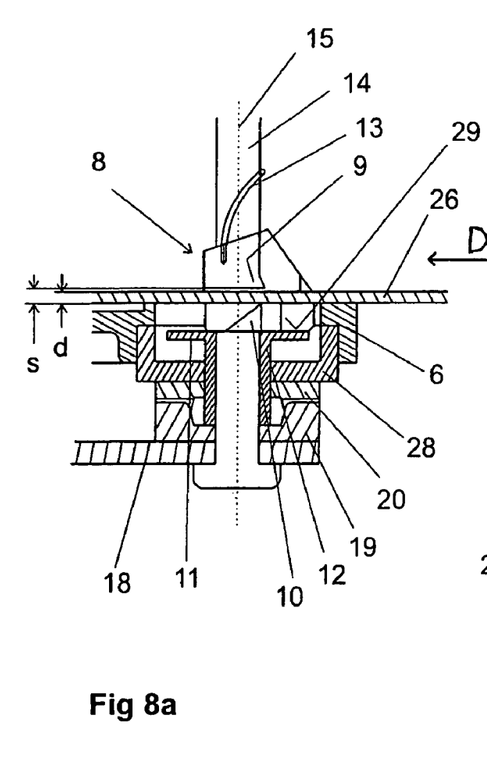

In the opened state of the securement device 7, a simple shift between setting unit 4 and holding unit 6 is possible. For this purpose it must be ensured that the blocking noses 9, 10 do not dig into the plate part 26. For this purpose a facing holder 12 with a facing stop 11 is provided, which is pressed by the cam plate 19 during the opening of the securement device 7 against the area segment 29 of the blocking element 8. This area segment 29 is thereby set parallel to the plane of the plate part 26, in which a further area segment of the blocking element 8 is planarly placed onto the plate part 26, i.e. the blocking element 8 is oriented against the spring tension of spring 13 parallel to the plate part 26, and one of the two blocking noses 9 is no longer in contact with plate part 26. An increase of the holding force of blocking element 8, if the plate part 26 is shifted with respect to the blocking element 8 in the displacement direction $v_c$, is thereby prevented such that the displacement of the setting unit 4 against a low friction force applied by the blocking element 8 is possible. The canting of the blocking element 8 is prevented in particular through the facing holder 12 such that the digging-in of one and/or both blocking noses 9, 10 cannot take place. Depending on the angular play of the blocking element 8 due to tolerance, the difference between the sheet metal thickness d of the plate part 26 and the distance s between the two blocking noses 9, 10 is also laid out for this purpose. FIG. 8a depicts schematically the operational function.

Figure 14:
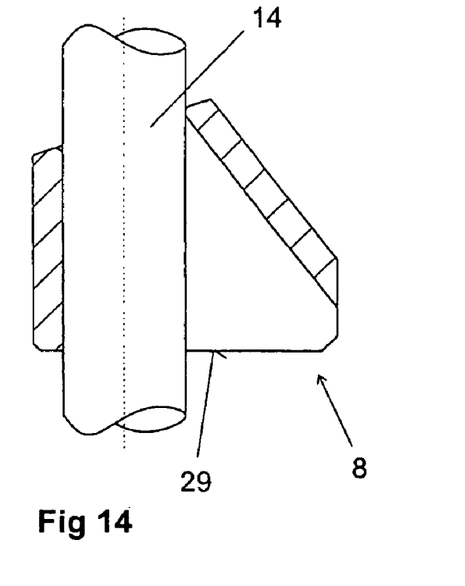
FIGS. 14, 15 and 16, 17 illustrate in two examples in section through the blocking element the position of the blocking element with respect to the clamp bolt.
Figure 15:
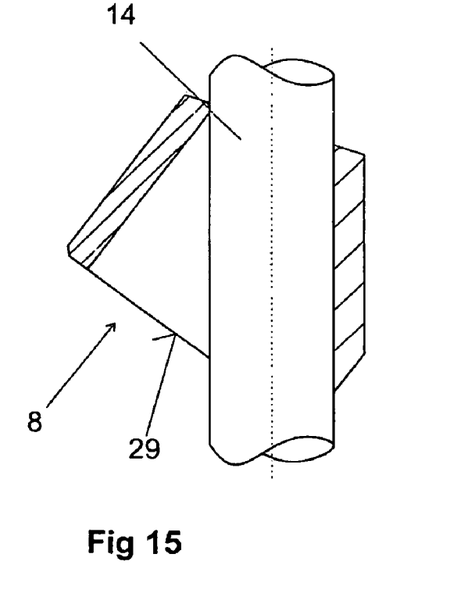
Figure 16:
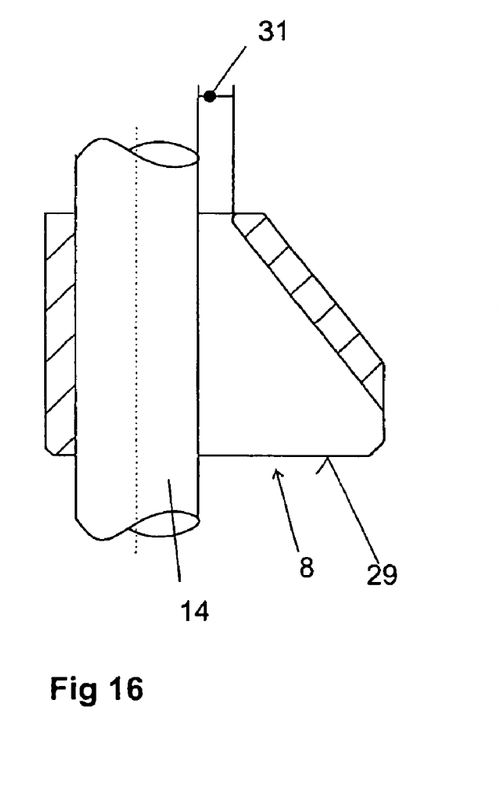
Figure 17:
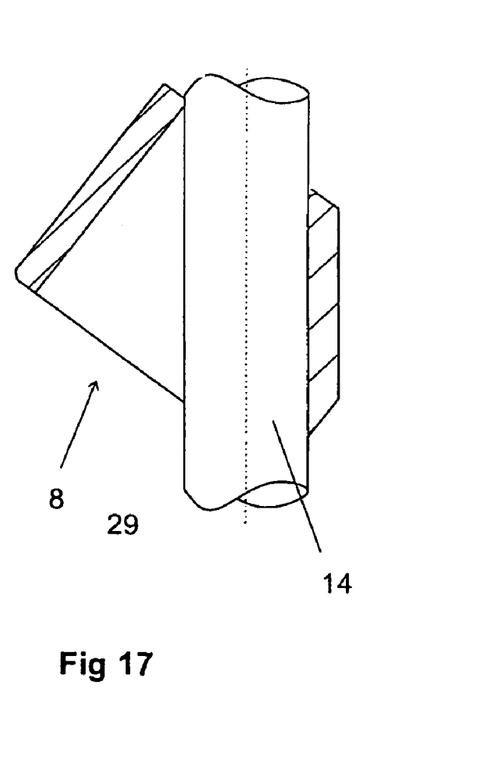

FIGS. 14, 15 and 16, 17 illustrate the significance of the surface facing away from facing holder 12 on blocking element 8 in conjunction with two different embodiments. In FIGS. 14 and 16 the positioning of the blocking element 8 with respect to the clamp bolt 14 in the opened state of the securement device 7 is illustrated. FIGS. 15 and 17 show correspondingly the positioning in the closed state of the securement device 7. If this face facing away from facing holder 12 is simply oriented parallel to the area segment 29, as in the embodiment example according to FIGS. 16 and 17, in the opened state of the securement device 7, a play 31 results between the clamp bolt 14 and the passage hole in blocking element 8. This play can lead to noises and/or canting, caused by unfavorable guidance, of the blocking element 8 during the displacement of the setting unit 4 with respect to the holding unit 6. Through a slanting-off of the face facing away from facing holder 12, as is illustrated in FIGS. 14 and 15, this play 31 can be minimized.

The advantage of the depicted embodiment of the steering column 1 with integrated crash blocking device includes inter alia that the arrangement is integrated into the securement device 7 such that it saves space and requires only few additional structural parts. The production of the parts and the assembly is simple.

The crash blocking device can furthermore be combined with various securement devices 7, such as for example clamping systems with toothings or with packs of lamellae. The crash blocking device can also with advantage be disposed on both sides of the holding part 6.

For the coupling between the securement device and the at least one blocking element 8 of the crash blocking device several different, in particular mechanically acting, elements can be utilized.

It is moreover also conceivable and feasible for every desired direction of the dislocation in a possible crash case, against which an additional holding force is to be raised, to provide analogously a blocking element cooperating with a plate part. Thus, it is possible to prevent or limit with such a device also only the uprighting of the setting unit 4 of the steering column (thus an upwardly directed dislocation into the displacement direction 33). Several blocking elements which act in different displacement directions and/or in the same displacement direction (and herein in the same or in the opposite directions) are conceivable and feasible. The directions in which the blocking noses 9, 10 are oriented must be adapted according to the desired direction of the holding force.

Figure 18:
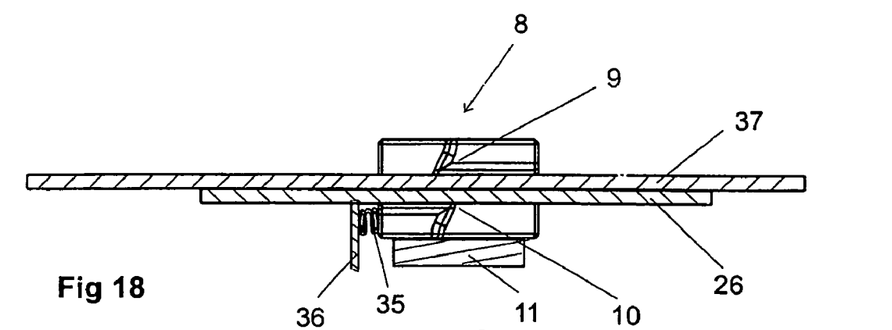
FIGS. 18 and 19 show schematic diagrams of a further embodiment of the invention in the active and passive state of the crash blocking device (in the form of sectional representations analogous to FIGS. 1 and 4, respectively)
Figure 19:
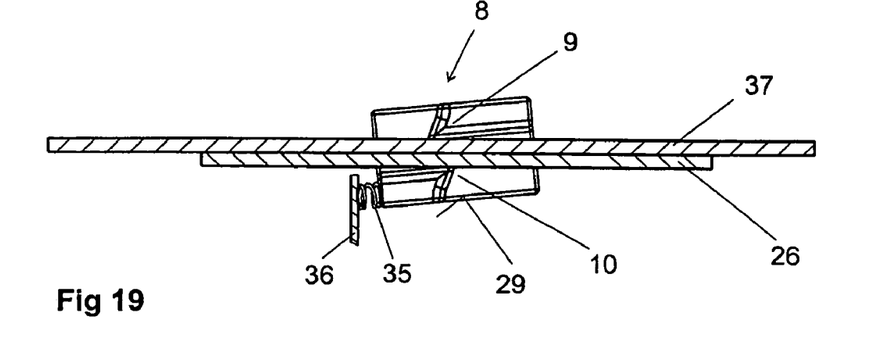
Figure 20:
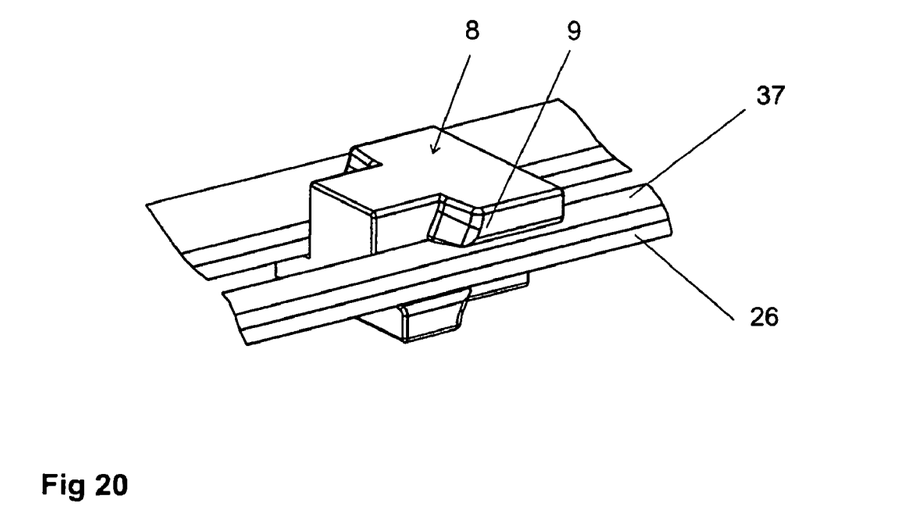
FIG. 20 shows an oblique view of the blocking element and of the plate parts according to this embodiment variant of the invention.

A further embodiment of the invention is depicted schematically in FIGS. 18 to 20. This embodiment variant differs from the previously described embodiments in that between the blocking noses 9, 10 of the blocking element 8 two plate parts 26, 37 are disposed which are in contact with one another with their main surface. In the active state of the crash blocking device through the canting of the blocking element 8 with the two blocking noses 9, 10, a shift is counteracted between the two plate parts into the displacement direction in which the blocking element 8 acts. One of the two plate parts 26, 37 is herein connected with the setting unit such that it is nonshiftable into this displacement direction, while the other plate part 26, 37 is connected with the holding unit such that it is nonshiftable into this displacement direction. The steering column can herein be developed, for example, in an otherwise analogous manner as in the previously described embodiment examples. The plate parts 26, 37 can, for example, be formed by side jaws of the setting unit or of the holding unit. Herein on only one side of the steering spindle or on both sides of the steering spindle, a blocking element 8 can be provided cooperating with plate parts 26, 37.

In order to permit in the passive state of the crash blocking device for setting the position of the steering column a mutual displacement of the plate parts 26, 37, the blocking element 8, in comparison to the active state of the crash blocking device, is again turned such that the canting of the two blocking noses 9, 10 with the plate parts 26, 37 is cancelled, cf. FIG. 18. To this end, for example, again a facing stop 11 can be provided through which the blocking element 8 by pressing onto one of the plate parts 26, 37 with respect to the plate parts 26, 37 is oriented straight. This facing stop 11 can, in turn, be coupled with the securement device 7.

To orient the blocking element 8 into its position, which it assumes in the active state of the crash blocking device (FIG. 19), at least one spring element 35 is provided. For example, a single such spring element 35 is provided which is fastened on one end at a holder 36, and on the other end on blocking element 8. Through its elasticity after the release of the blocking element 8, by raising the facing stop 11, spring element 35 brings the blocking element 8 into its active position. For example, two spring elements 35 could also be provided, which act from opposite sides onto the blocking element 8. Conceivable and feasible would also be, for example, that the spring element 35 is a compression spring, wherein the blocking element 8 is stayed on a stop on one of the two plate elements 26, 37. This stop can be formed, for example, by the end of an elongated hole through which penetrates the blocking element 8.

Figure 8B:
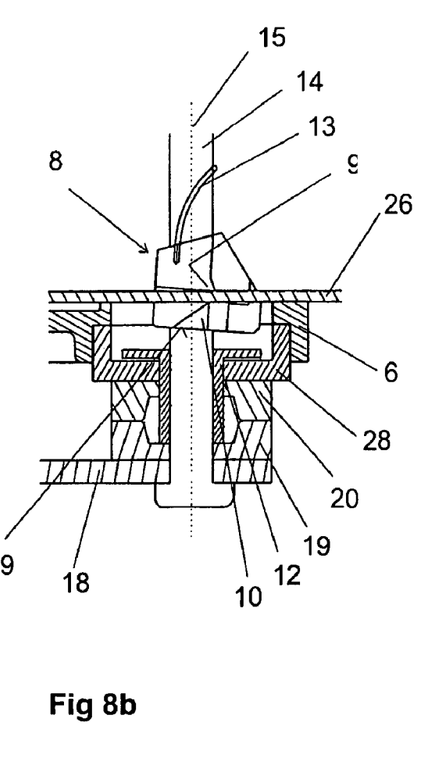
Figure 8C:
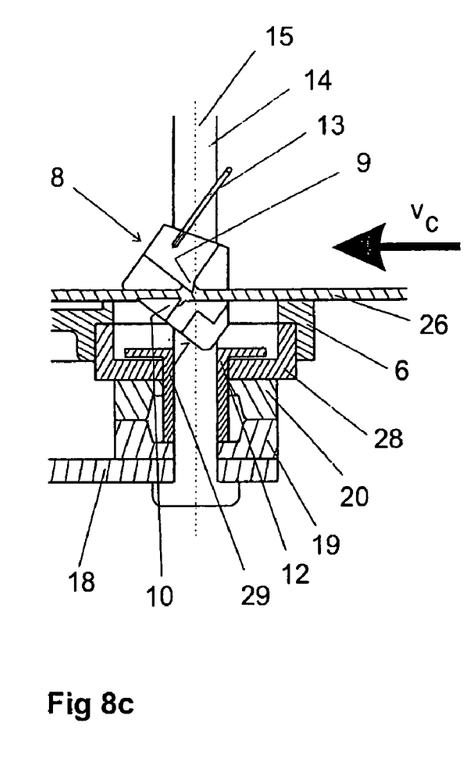

However, it is also conceivable and feasible to utilize a spiral spring, analogous to the spring 13 depicted in FIGS. 8*a*, 8*b*, 8*c*. The spiral spring would need to be stayed in an analogous manner as the compression spring 35 shown in FIGS. 18 and 19 on a stop, which, with respect to one of the two plate parts 26, 37, is disposed such that it is nonshiftable.

The holder 36 can, for example, be fastened on one of the plate parts 26, 37 or on a part rigidly connected therewith.

The blocking element 8 can be penetrated by the clamp bolt or be disposed apart from the clamp bolt.

The invention is also applicable in securement devices without a clamp bolt.

As is evident based on the above description, the scope of the invention is not limited to the depicted embodiments, but rather should be determined with reference to the attached claims together with its full range of possible equivalents. While the preceding description and the drawing represent the invention, it is obvious to a person of skill in the art that various modifications can be carried out therein without leaving the true spirit and scope of the invention.

Legend to the Reference Numbers

1 Steering column
2 Steering spindle
3 Steering spindle axis
4 Setting unit
5 Swivel axis
6 Holding unit
7 Securement device
8 Blocking element
9 Blocking nose
10 Blocking nose
11 Facing stop
12 Facing holder
13 Spring
14 Clamp bolt
15 Clamp bolt axis
18 Clamping lever
19 Cam plate
20 Connecting link plate
21 Compression spring
23 Clamping block
24 Toothed plate
25 Carrying unit
26 Plate part
27 Elongated hole
28 Plate
29 Area segment
30 Parting plane
31 Play
32 Displacement direction
33 Displacement direction
34 Elongated hole
35 Spring element
36 Holder
37 Plate part

The invention claimed is:

1. An adjustable steering column for a motor vehicle comprising:
    a setting unit displaceable into at least one displacement direction for setting the position of the steering column,
    a holding unit nondisplaceable into the at least one displacement direction,
    a securement device, in an opened state of which the setting unit is displaceable with respect to the holding unit for setting a position of the steering column and in a closed state of which the setting unit is secured in position by the securement device, and
    a crash blocking device displaceable between a passive state, in which the setting unit is displaceable with respect to the holding unit in the opened state of the securement device for setting the position of the steering column, and an active state, in which the crash blocking device raises an additional holding force against a displacement of the setting unit with respect to the holding unit in at least one displacement direction,
    wherein the crash blocking device has one of a first configuration and a second configuration,
        the crash blocking device having the first configuration comprises at least one blocking element with at least two blocking noses, a plate part being located between the at least two blocking noses, and in the active state of the crash blocking device, the at least two blocking noses are in contact on opposite sides of the plate part, and wherein either the blocking element is connected with the holding unit such that it is nonshiftable into the displacement direction in which the blocking element is effective and the plate part is connected with the setting unit nonshiftable into this displacement direction, or the blocking element is connected with the setting unit nonshiftable into the displacement direction in which the blocking element is effective and the plate part is connected with the holding unit nonshiftable into this displacement direction, and
        the crash blocking device having the second configuration comprises at least one blocking element with at least two blocking noses, two plate parts in contact with one another being located between the at least two blocking noses, and in the active state of the crash blocking device, the at least two blocking noses are in contact with the surfaces, facing away from one another, of the two plate parts, and wherein one of the two plate parts is connected with the holding unit such that it is nonshiftable into the displacement direction in which the blocking element is effective, and the other of the two plate parts is connected with the setting unit such that it is nonshiftable into this displacement direction.

2. The adjustable steering column as claimed in claim 1, wherein the blocking element can be turned out of position about an axis with respect to at least one of the plate parts, the axis being parallel to a plane of the at least one of the plate parts and at right angles to the displacement direction in which this blocking element is effective.

3. The adjustable steering column as claimed in claim 1, wherein in the passive state of the crash blocking device at least one of the blocking noses cooperating with a surface of at least one of the two plate parts is raised from the surface.

4. The adjustable steering column as claimed in claim 3, wherein the blocking element upon a displacement rotates between the passive state and the active state of the crash blocking device about an axis parallel to the at least one of the plate parts and perpendicular to the displacement direction.

5. The adjustable steering column as claimed in claim 1, wherein through a coupling of the crash blocking device with the securement device the crash blocking device is displaced during the opening of the securement device from its active state into its passive state and during the closing of the securement device from its passive state into its active state.

6. The adjustable steering column as claimed in claim 1, wherein the crash blocking device is integrated into the securement device.

7. The adjustable steering column as claimed in claim 1, wherein at least one of the blocking noses has an area segment directed toward at least one of the plate parts, the segment forming, in the active state of the crash blocking device with the surface of this plate part an angle ($\alpha$) which, at least unless the crash event has occurred, is greater than 0° and less than 10°, and one end of this area segment of the at least one of the blocking noses is in contact with the surface of at least one of the plate parts.

8. The adjustable steering column as claimed in claim 7, wherein this area segment in the passive state of the crash blocking device forms with the surface of the at least one of the plate parts an angle ($\alpha$) of approximately 0° and is raised away from the surface of the at least one of the plate parts.

9. The adjustable steering column as claimed in claim 5, wherein a clamp bolt of the securement device bears a facing holder displaceable in the axial direction of the clamp bolt, the holder during the opening of the securement device comes into contact with the blocking element and raises at least one blocking nose located on one side of at least one of the plate parts from the at least one of the plate parts.

10. The adjustable steering column as claimed in claim 1, wherein the additional holding force of the crash blocking device is generated by scraping of at least one of the blocking noses on the surface of at least one of the plate parts.

11. The adjustable steering column as claimed in claim 1, wherein the additional holding force of the crash blocking device is generated by parting material from the surface of at least one of the plate parts via at least one of the blocking noses.

12. The adjustable steering column as claimed in claim 1, wherein the additional holding force of the crash blocking device is raised by a form locking which is brought about by the digging of at least one of the blocking noses into the surface of at least one of the plate parts.

13. The adjustable steering column as claimed in claim 1, wherein the blocking element with its blocking noses encompasses at least one longitudinal edge, extending parallel to the displacement direction in which the blocking element is effective, of at least one of the plate parts or a cutout in the at least one of the plate parts.

14. The adjustable steering column as claimed in claim 1, wherein the blocking element penetrates a cutout in at least one of the plate parts which is developed in the form of an elongated hole, extending parallel to the displacement direction in which the blocking element is effective, and the blocking element comprises on two opposite sides at least one blocking nose each and the blocking noses are located on both sides of the at least one of the plate parts.

15. The adjustable steering column as claimed in claim 1, wherein the blocking element is disposed on a clamp bolt of the securement device and is connected with the clamp bolt nonshiftably into the displacement direction in which it is effective, and the clamp bolt is connected with the holding unit or the setting unit nonshiftably into the displacement direction and at least one of the plate parts is connected nonshiftably with the other of holding unit or the setting unit.

16. The adjustable steering column as claimed in claim 1, wherein a blocking element is provided effective in a displacement direction corresponding to the length adjustment of the steering column.

17. The adjustable steering column as claimed in claim 1, wherein at least one of the plate parts is formed by at least a portion of a side jaw of the setting unit or at least a portion of a side jaw of the holding unit.

18. The adjustable steering column as claimed in claim 1, wherein at least one blocking nose of the blocking element includes a pointed or a blade-form end the pointed or blade-form end being in contact with at least one of the plate parts at least in the active state of the crash blocking device.

19. The adjustable steering column as claimed in claim 1, wherein in the active state of the crash blocking device the blocking noses are brought into engagement with at least one of the plate parts such that with an incipient shift ($v_c$) of the at least one of the plate parts relative to the blocking element into the direction parallel to the displacement direction, in which the blocking element is effective, a holding force results additional to the holding force raised by the blocking element counteracting the further shift.

20. The adjustable steering column as claimed in claim 1, wherein with an incipient shift ($v_c$) of at least one of the plate parts relative to the blocking element in the direction parallel to the displacement direction in which the blocking element is effective, a torque results acting onto the blocking element, through which at least one of the blocking noses is pressed more strongly onto the at least one of the plate parts.

21. The adjustable steering column as claimed in claim 1, further comprising a spring which in the closed state of the securement device acts upon the blocking element into a position corresponding to the active state of the crash blocking device.

22. The adjustable steering column as claimed in claim 1, wherein at least one of the plate parts is located in a plane oriented parallel to the displacement direction in which acts the blocking element cooperating with the at least one of the plate parts.

23. The adjustable steering column as claimed in claim 1, wherein the blocking noses in the active state of the crash blocking device are in contact with a main surface of at least one of the plate parts.

* * * * *